3,674,527
PIGMENT COMPOSITIONS
Alfons Anzelm Komander, Manchester, England, assignor to Imperial Chemical Industries Limited, London, England
No Drawing. Filed Jan. 9, 1970, Ser. No. 1,849
Claims priority, application Great Britain, Jan. 14, 1969, 2,097/69
Int. Cl. C08h 17/66
U.S. Cl. 106—289  8 Claims

ABSTRACT OF THE DISCLOSURE

Manufacture of pigment compositions by simultaneously precipitating heavy metal lake of a water soluble acid dye heavy metal salt of a rosin, at pH 7–8 in presence of a non-ionic surface active agent which has a cloud point at or below the temperature at which the precipitation is carried out.

---

This invention relates to a process for the manufacture of pigment compositions containing "lakes" of water soluble acid dyestuffs and rosin salts of heavy metals.

The term "lake," used herein, has the same meaning as in "Colour Index" (see volume 2, page 2697): that is to say it indicates an insoluble salt of a water-soluble acid dyestuff which salt is valuable as a pigment. Lakes of water-soluble acid dyestuffs are formed by double-decomposition with water-soluble salts of heavy metals, including alkaline earth metals particularly calcium and barium.

It is known to manufacture pigment compositions called "rosinated lakes" by combining solutions of water-soluble acid dyes with water-soluble rosin salts and mixing with water-soluble heavy metal salts, thereby forming simultaneously the heavy metal lake of the dye and the heavy metal salt of the rosin. In such a process there may be used chemically modified rosins for example hydrogenated rosin, polymerised rosin, disproportionated rosin and esterified rosin and rosin which has been subjected to more than one such modification treatment, and all these are herein included in the general term "rosin." Our experience has shown that in order to produce products with the best tinctorial properties admixture of the combined dyestuff and rosin solutions with heavy metal salt should be carried out at pH 7–8. Products produced at this pH, however, tend to harden on drying and have inferior dispersion properties when compared with products at pH 4–6.

According to the invention a process for the manufacture of a pigment composition comprises mixing an aqueous solution of a water-soluble heavy metal salt with an aqueous solution containing (1) a water-soluble salt of an acid dyestuff capable of forming with the heavy metal an insoluble lake and (2) a water-soluble rosin salt, whereby to precipitate heavy metal lake of the dyestuff and heavy metal salt of the rosin, the mixing being carried out at pH 7–8 and in the presence of a non-ionic surface active agent which has a cloud point at or below the temperature at which the mixing is carried out.

Acid dyestuffs which may be used in the process of the invention include those acid dyestuffs which in "Colour Index" are designated "Dye for Lakes."

The process is of especial value with azo dyestuffs made by coupling diazotised aniline sulphonic acids (which expression includes those containing substituents, e.g. methyl groups and halogen atoms) with 2-hydroxy-3-naphthoic acid, particularly azo dyestuffs of the following formulae in which the arrow is used conventionally to indicate "diazotised and coupled with."

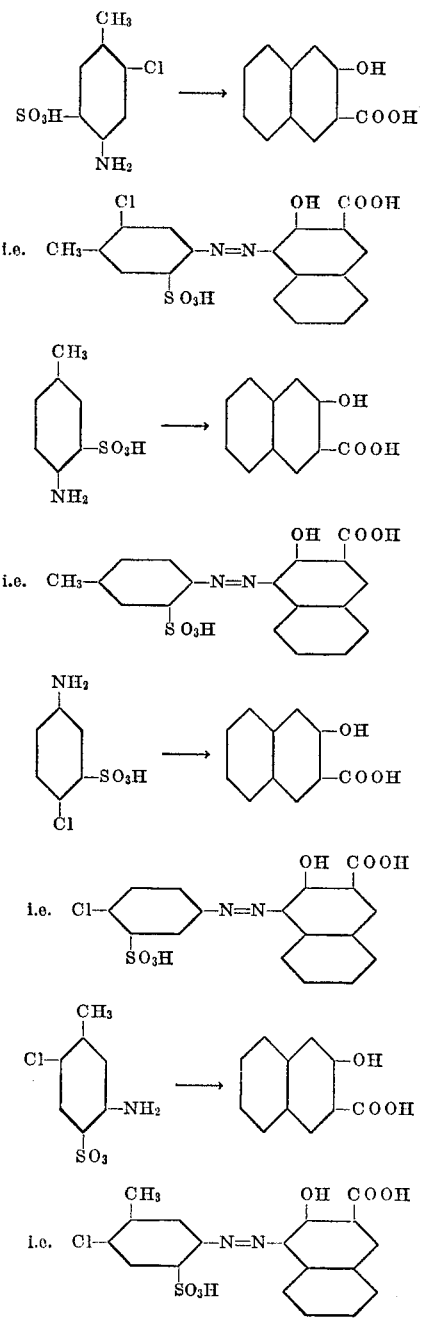

Lakes of these dyestuffs are of deep red shade and are commercially valuable. With these, as with other acid dyestuffs the process of the invention produces rosinated lakes having improved texture and dispersibility in printing inks and paint vehicles.

The water-soluble rosin salt used in the process may conveniently be a sodium or potassium salt.

The term "heavy metal" as used herein includes alkaline earth metals. Indeed the heavy metal salts used in the process are preferably salts of alkaline earth metals, especially calcium or barium, but water-soluble salts of any heavy metal may be used, for example cobalt or manganese salts.

Non-ionic surface active agents which may be used in the process include long chain alkylphenols, alkanols, or alkylamines and especially condensates thereof with an alkylene oxide for example ethylene oxide. The expression long chain means a chain containing at least 8 carbon atoms.

The cloud point is the temperature at which a dilute aqueous solution becomes cloudy, due to deposition of the surface active agent from a saturated solution. This point is easily determined by observation of a solution during heating. If the solution does not become cloudy on heating the surface active agent is not suitable for use in the process. By means of this simple test it is possible to choose from the many non-ionic surface active agents which are available those which are best suited for use.

Particular non-ionic surface active agents which have been found suitable are:

Condensates of alkylphenols (preferably having at least 8 carbon atoms in the alkyl group) with 1 to 10 moles of ethylene oxide, e.g. p-nonylphenol with 1 mole of ethylene oxide or 6 moles of ethylene oxide, p-octylphenol with 7 moles of ethylene oxide, cetyl/oleyl alcohol with 3.5 moles of ethylene oxide.

Condensates of long chain alcohols (preferably containing at least 12 carbon atoms) with 1 to 5 moles of ethylene oxide, e.g. oleyl or cetyl alcohol with 1 mole of ethylene oxide or 5 moles of ethylene oxide.

It is convenient to incorporate the non-ionic surface active agent with the aqueous solution of the heavy metal salt and to buffer the solution at pH 7–8. Alternative procedure is to incorporate it in the mixed dyestuff and rosin solutions. During mixing of the heavy metal salt solution with the mixed dyestuff and rosin solutions the pH should be maintained at 7–8 and for this purpose it is usually necessary to add small amounts of an acid, e.g. dilute hydrochloric acid.

After the mixing operation the mixture of solids may be filtered off, washed free of salts and dried to produce a pigment composition which has excellent dispersion properties in organic media as well as good tinctorial strength and transparency.

Before filtering it is advantageous to raise the temperature of the aqueous slurry above the softening point of the heavy metal rosinate. In this way there may be formed a pigment composition of the type claimed in United Kingdom Pat. No. 978,242, i.e. a pigment composition comprising a finely divided organic pigment and a resinous substance, the composition containing at least 60% by weight of pigment and the volume concentration (as therein defined) of pigment in the composition when under a uniform compressive pressure of 20 pounds per square inch being less than 18%.

The invention is illustrated but not limited by the following examples in which the parts and percentages are by weight:

EXAMPLE 1

35.8 parts of 4-amino-3-toluene sulphonic acid and 0.36 part of 1-amino-5-naphthalene sulphonic acid are dissolved in 360 parts of water containing 17 parts of ammonium hydroxide solution of specific gravity 0.88. After filtration, the sulphonic acids are precipitated by the addition of 45 parts of hydrochloric acid of specific gravity 1.18. Ice is added and diazotisation is effected in the usual manner by the addition of 15 parts of sodium nitrite dissolved in 50 parts of water.

36.8 parts of 2-hydroxy-3-naphthalene carboxylic acid is suspended in 1000 parts of water at 0°–5° C. The prepared diazo suspension (the pH of which has been increased to about 6.0 by the addition of a dilute solution of sodium hydroxide) is added and coupling is effected by the addition of 5.5 parts of ammonium hydroxide (S.G. 0.88) followed by 420 parts of 1.5 N sodium hydroxide solution over 30 minutes. The resultant dyestuff sodium salt is treated with 352 parts of a 10% sodium rosinate solution; the temperature of the mixture being not greater than 10° C.

80 parts of $CaCl_2.2H_2O$ and 40 parts of $CH_3COONa.3H_2O$ are dissolved in 1760 parts of water at 20–25° C. and 1 part of a non-ionic surface active agent comprising a condensate of a nonyl phenol with 5 moles of ethylene oxide is added followed by sufficient hydrochloric acid to reduce the pH to 7.0. The dyestuff-rosin mixture is added to this solution during 45 minutes whilst maintaining the pH in the range 7–8 by the addition of dilute hydrochloric acid. The laked slurry, so produced, is adjusted to pH 7.0 and heated to 80° C. for 30 minutes. It is finally adjusted to pH 9.0 using a 5% solution of ammonium hydroxide before cooling to about 30° C. filtering, washing salt free and drying at 70° C.

The product has excellent tinctorial strength and transparency and disperses easily on stirring with an alkyd paint medium.

An equally satisfactory product is obtained by using 2.5 parts of a condensate of p-octyl phenol with 7 moles of ethylene oxide.

Each of the surface active agents has a cloud point below the temperature of laking.

EXAMPLE 2

35.8 parts of 4-amino-3-toluene sulphonic acid and 0.36 part of 1-amino-5-naphthalene sulphonic acid are dissolved in 360 parts of water containing 17 parts of ammonium hydroxide solution of specific gravity 0.88. After filtration, the sulphonic acids are precipitated by the addition of 45 parts of hydrochloric acid of specific gravity 1.18. Ice is added and diazotisation is effected in the usual manner by the addition of 15 parts of sodium nitrite dissolved in 50 parts of water.

360 parts (at 100%) of 2 hydroxy-3-naphthalene carboxylic acid are dissolved in 1,500 parts of water containing 360 parts of 48% sodium hydroxide solution. To this solution is added rosin solution, prepared by dissolving 352 parts of freshly crushed rosin in 350 parts of water containing 98 parts of 48% sodium hydroxide solution, followed by 1 part of a non-ionic surface active agent comprising a condensate of a nonyl phenol with 5 moles of ethylene oxide. 15 minutes before coupling/laking is due to start calcium chloride solution, prepared by dissolving 404 parts of calcium chloride in 60 parts of water, is added and after agitating for 10 minutes 115 parts of 48% sodium hydroxide solution are charged.

The prepared diazo suspension is run during 45 minutes below the surface of the laked 2-hydroxy-3-naphthalene carboxylic acid containing rosin and the non-ionic agent.

The pH of the final laked slurry is adjusted to pH 7.0 and the temperature is raised to 80° C. and maintained for 30 minutes. It is finally adjusted to pH 9.0 using 5% solution of ammonium hydroxide before cooling to about 30° C. filtering, washing salt free and drying at 70° C.

The product has even better dispersion properties than that prepared by the method of Example 1.

In Examples 1 and 2 the 1-amino-5-naphthalenesulphonic acid may be replaced by 1-amino-2-naphthalenesulphonic acid giving products with enhanced blueness of shade, and physical properties similar to those of the products already described.

What is claimed is:

1. A process for the manufacture of a pigment composition which process comprises mixing an aqueous solution of a water-soluble salt of an alkaline earth metal with an aqueous solution containing
    (1) a water-soluble salt of an acid dyestuff capable of forming with said alkaline earth metal an insoluble lake and
    (2) a water-soluble rosin salt
whereby to precipitate alkaline earth metal lake of said dyestuff and alkaline earth metal salt of said rosin, the mixing being carried out at pH 7–8 and in the presence of a non-ionic surface active agent which has a cloud point at or below the temperature at which the mixing is carried out.

2. Process according to claim 1 wherein the acid dyestuff is an azo dyestuff made by coupling a diazotised aniline sulphonic acid with 2-hydroxy-3-naphthoic acid.

3. Process according to claim 2 wherein the azo dyestuff is essentially of the formula:

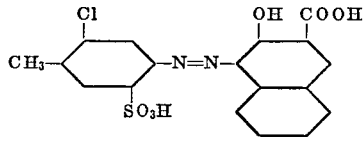

4. Process according to claim 2 wherein the azo dyestuff is essentially of the formula:

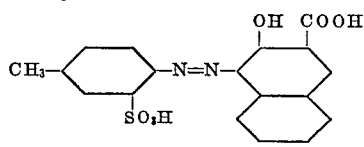

5. Process according to claim 2 wherein the azo dyestuff is essentially of the formula:

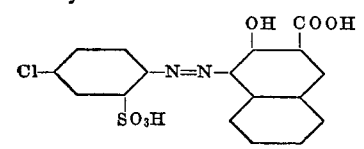

6. Process according to claim 2 wherein the azo dyestuff is essentially of the formula:

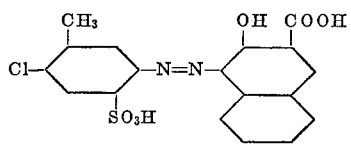

7. Process according to claim 1 wherein the non-ionic surface active agent is a condensate of an alkylphenol, alkanol or alkylamine having in each case at least 8 carbon atoms in its alkyl chain with from 1 to 10 moles of an alkyl oxide.

8. Process according to claim 1 wherein the non-ionic surface active agent is a condensate of an alkanol containing at least 12 carbon atoms with 1 to 5 moles of ethylene oxide.

References Cited

UNITED STATES PATENTS

| | | | |
|---|---|---|---|
| 2,744,027 | 5/1956 | Struve et al. | 106—289 |
| 2,772,983 | 12/1956 | Grimm et al. | 106—289 |
| 2,811,515 | 10/1957 | Stocker | 106—289 |
| 3,157,632 | 11/1964 | Ribka | 106—289 |
| 3,444,157 | 5/1969 | Tanaka et al. | 106—289 |
| 3,459,572 | 8/1969 | Lee | 106—289 |

JAMES E. POER, Primary Examiner